Dec. 6, 1955 W. H. FUTTERER 2,725,851
PARAKEET CAGE
Filed Jan. 19, 1954 2 Sheets-Sheet 1
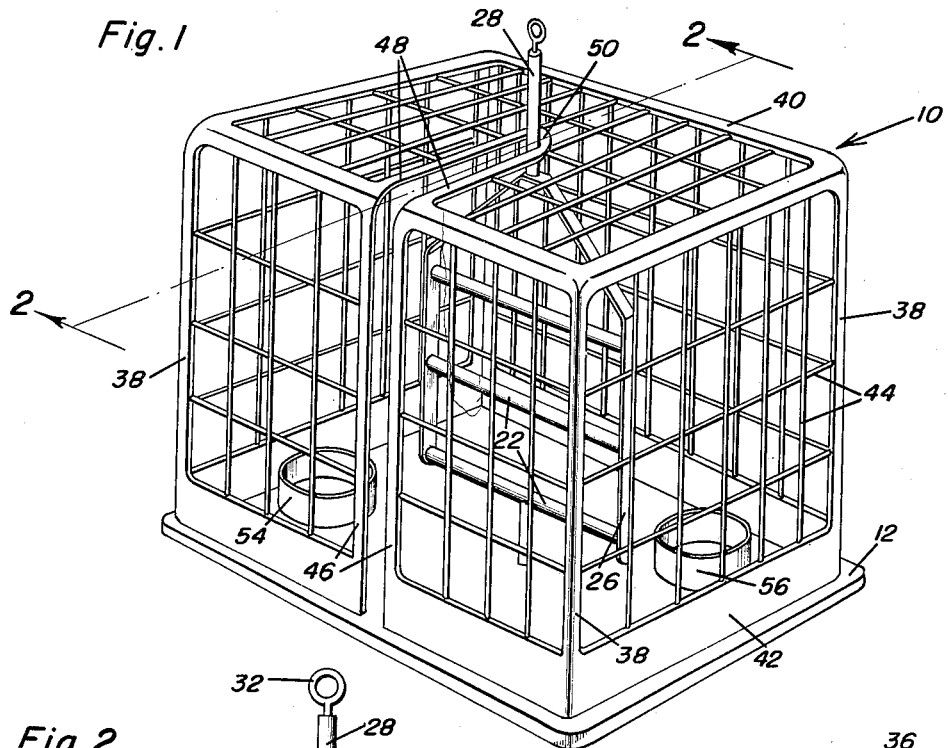
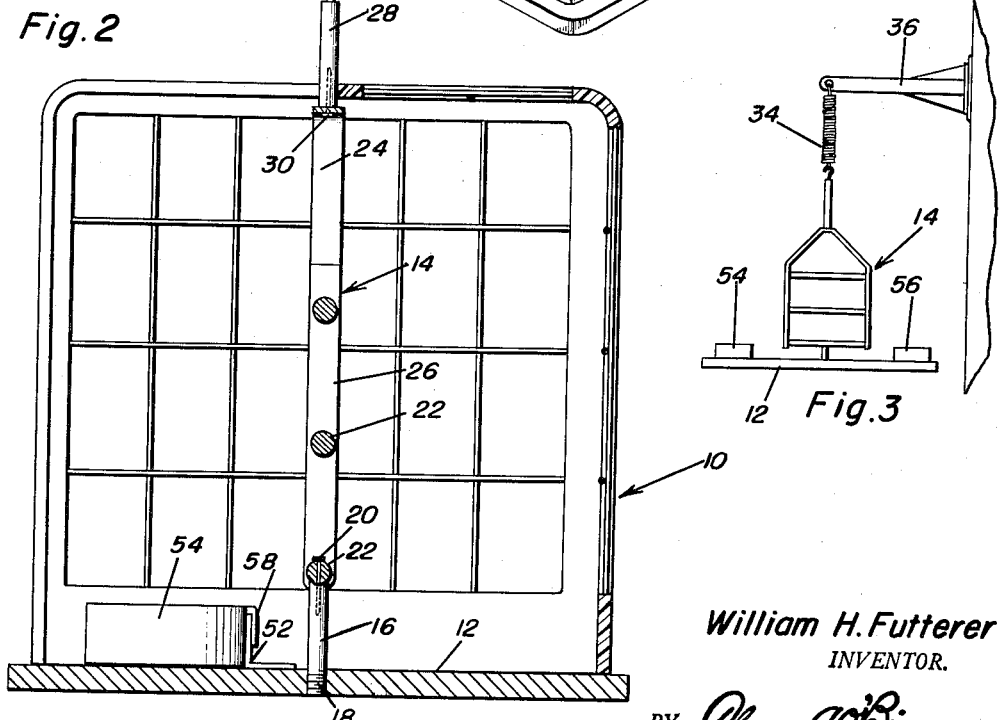
William H. Futterer
INVENTOR.

Dec. 6, 1955  W. H. FUTTERER  2,725,851
PARAKEET CAGE
Filed Jan. 19, 1954  2 Sheets-Sheet 2

William H. Futterer
INVENTOR.

BY *Clarence A. O'Brien*
*and Harvey B. Jacobson*
Attorneys

United States Patent Office 2,725,851
Patented Dec. 6, 1955

2,725,851

PARAKEET CAGE

William H. Futterer, Key West, Fla.

Application January 19, 1954, Serial No. 404,962

4 Claims. (Cl. 119—17)

This invention relates generally to bird cages and pertains more particularly to a cage particularly adapted and suited for use with parakeets.

A primary object of this invention is to provide an improved form of bird cage which incorporates a base member and a removable cover therefor, the base being provided with a perch as well as a watering and feeding station thereon and the cover being so formed as to be easily removable from the base such that a parakeet may be free to fly about a room or return to his perch as he may desire.

Another object of this invention is to provide an improved form of bird cage in conformity with the foregoing object wherein the cover is provided with an elongated slot extending from one edge thereof to the center of its top and wherein the base is supported from a suitable standard by virtue of a connection at the upper end of its perch such that the cover may be removed from the cage without unhanging the base.

Still another object of this invention is to provide an improved form of parakeet cage in which a slideable top portion is utilized in the cover assembly such that the cover may be dropped over the base and removed therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view over a parakeet cage constructed in accordance with this invention;

Figure 2 is an enlarged vertical section taken substantially along the plane of section line 2—2 of Figure 1;

Figure 3 is an elevational view on a smaller scale showing the base suspended from a standard assembly;

Figure 4:
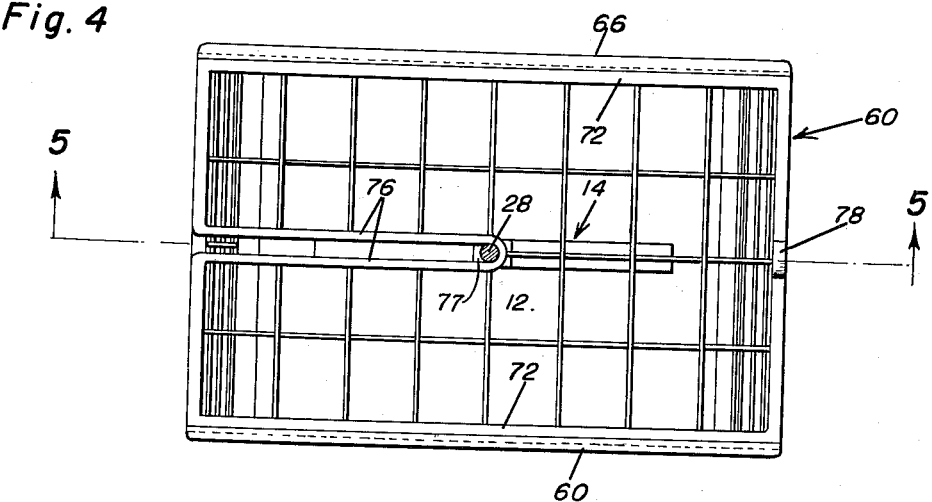
Figure 4 is a top plan view of a modified form of the invention.

Referring now more particularly to Figures 1–3, the cage assembly is indicated generally by the reference character 10 and will be seen to incorporate a base member 12 which may be of the rectangular configuration as shown or any other desired form. A perch assembly indicated generally by the reference character 14 is secured centrally of and in upstanding relation to the base member 12 and is preferably formed with an upstanding arm member 16 provided with threads 18 at its lower end for reception in the base and fastened at its upper end by suitable members such as the nail 20 to the lower of the perch bars 22. A generally U-shaped frame 24 including the spaced vertical leg members 26 is utilized to support the perch bars 22, the opposite ends of the latter being rigidly secured to opposite legs to form a ladder like construction upon which a parakeet may exercise himself. The upper ends of the legs 26 are mutually convergent as shown and at their point of juncture an elongated rod member 28 is secured as by an eye 32 to which the usual spring member 34 of a bird cage supporting assembly may be attached. Reference numeral 36 indicates a wall bracket or any other desired standard assembly for supporting the cage.

A reticulated cover assembly 37 is provided for the base which takes the form of a series of vertical corner post members 38 interconnected at their lower and upper ends respectively by the strut members 40 and 42. The corner post and strut members are, in turn, also connected with the cage bar members 44 so that the assembly as a whole is formed of reticulated side walls and a top, the bottom being open and the cover assembly resting at its lower edge 43 on the base member 12.

For the purpose of removably positioning the cover on the base, a slot 45 is provided in one side wall and half of the top of the cover as seen most clearly in Figure 1, this slot being formed by the spaced uprights 46 on one side wall and the spaced strut members 48 formed as continuations thereof and interconnected by bight portion 50 at their inner ends. It is to be noted that the slot is of such width to permit the passage therethrough of the perch assembly 14 such as when it is desired to remove the cover from the base, it is merely necessary to simultaneously rock and slide the cover assembly 37 so that the perch assembly passes out through the slot.

It is also desirable to provide on the base member 12 a pair of L-shaped bracket members 52 on opposite sides of the perch assembly such that the water and feed stations 54 and 56 may be secured on the base, the stations being provided with depending legs 58 for being clipped on the bracket assemblies 52.

Figure 5:
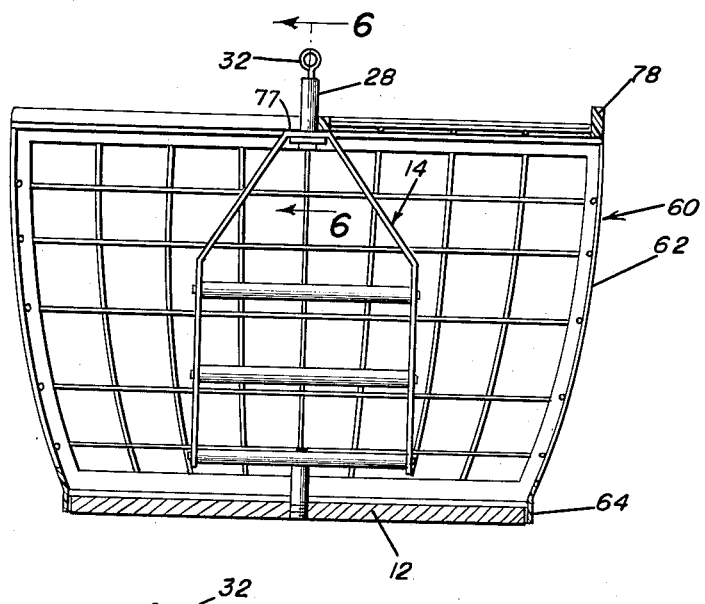
Figure 5 is a vertical section taken substantially along the plane of section line 5—5 of Figure 4.
Figure 6:
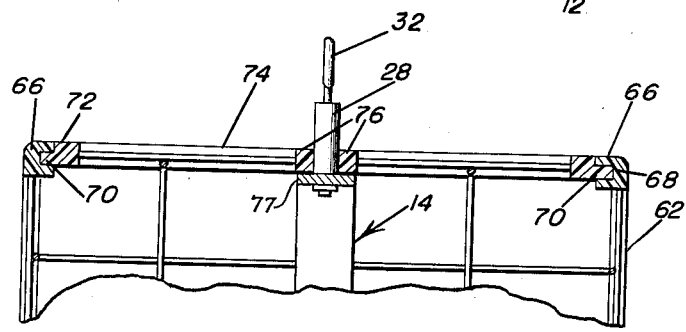
Figure 6 is an enlarged vertical section taken substantially along the plane of section line 6—6 in Figure 5.

Referring now more particularly to Figures 4–6, wherein a modified form of the assembly is shown, it is to be noted that the base and associated elements are as previously described but that the cage assembly is indicated generally by the reference character 60 incorporates the outwardly sloping side walls 62 of reticulated construction and that they are provided at their lower edges with a peripheral flange 64 which surrounds the base member 12 as seen most clearly in Figure 5. The upper edges 65 of a pair of the side walls 62 are provided with guide rails 66 having slots 68 therein for reception of tongues 70 formed on the opposite side frame members 72 of the cover assembly 74. A slot is formed in the cover assembly and extends from one end 75 thereof between the spaced strut members 76 such as to receive the rod 28 therebetween in the manner shown. As seen in Figures 5 and 6, the perch assembly 14 includes a horizontal shoulder 77 upon which a cage assembly 60 will rest through the medium of spaced struts 76. In this manner, to remove the cover assembly from the base 12, it is merely necessary to slide the top of the cover back or completely off the cover assembly such as the cage may drop down over the base and be removed therefrom. In this respect, the top may be provided with a finger tab portion 78 as an aid to manipulating the same.

By use of the above described assembly, it will be manifest that an extremely desirable parakeet cage is produced inasmuch as it is not necessary to disturb the base member from its standard or supporting bracket when it is desired to remove the cover or assembly and permit the parakeet freedom. The bird may fly about the room at will or may roost upon the perch assembly.

The case assembly may be formed of any suitable material such as plastic, wood, metal or the like and may be supplied in a variety of colors and shapes.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be restored to, falling within the scope of the appended claims.

What is claimed as new is as follows:

1. A cage assembly including a base, a vertically disposed perch assembly extending upwardly from said base including an upwardly extending portion for securement to a support bracket, and a reticulated removable cover assembly including top and side wall portions cooperating with said base to form an enclosure around said perch assembly on said base, said cage assembly including a pair of elongated strut members connected by a bight position forming a transversely disposed elongated open-sided slot through which the upwardly extending portion of said perch assembly extends for permitting ready removal of said cage assembly from said base.

2. A cage assembly as set forth in claim 1 wherein said cage assembly includes a lower edge portion engageable on the surface of said base, and in which the portions defining the open-sided slot extend from said edge portion of said cage assembly to the bight portion connecting said elongated members.

3. A cage assembly as set forth in claim 2 wherein said cage assembly includes a pair of vertically extending upright portions terminating in continuously inwardly directed portions connected by said bight portion for permitting transverse removal of said cage assembly relative to said base and perch assembly.

4. A cage assembly as set forth in claim 1 wherein said cage assembly includes side wall portions including a pair of oppositely disposed guide rails, a reticulated cover slidably supported in the guide rails of said side wall portions of said cage assembly, said cover including a pair of elongated members connected by a bight portion forming a transverse elongated open slot through which the upwardly extending portion of said perch assembly extends, and a supporting shoulder on said upwardly extending portion of said perch assembly for supporting said cage assembly thereon.

References Cited in the file of this patent

UNITED STATES PATENTS

| | | |
|---|---|---|
| 1,123,044 | Warnecke | Dec. 29, 1914 |
| 1,719,013 | Jones | July 2, 1929 |
| 2,065,923 | Jessen | Dec. 29, 1936 |
| 2,614,838 | Taylor | Oct. 21, 1952 |